United States Patent [19]

McCaslin et al.

[11] Patent Number: 5,442,606
[45] Date of Patent: Aug. 15, 1995

[54] ELECTROMAGNETIC LENS ACTUATOR FOR OPTICAL DISK DRIVE

[75] Inventors: Martin McCaslin, Pleasanton; Brad Johnson, Santa Clara, both of Calif.

[73] Assignee: Hyundai Electronics America, Inc., Milpitas, Calif.

[21] Appl. No.: 259,275

[22] Filed: Jun. 13, 1994

Related U.S. Application Data

[63] Continuation of Ser. No. 42,332, Apr. 2, 1993, abandoned.

[51] Int. Cl.⁶ .............................................. G11B 7/12
[52] U.S. Cl. ................... 369/44.15; 369/44.14; 359/813; 359/823
[58] Field of Search ............... 369/44.15, 44.14, 44.16, 369/44.22, 44.28, 44.32, 247, 248; 359/813, 814, 823, 824

[56] References Cited

U.S. PATENT DOCUMENTS

| | | | |
|---|---|---|---|
| 4,016,504 | 4/1977 | Klauminzer | 331/94.5 |
| 4,368,957 | 1/1983 | Chirra | 350/469 |
| 4,389,101 | 6/1983 | Van Rosmalen | 369/44.14 X |
| 4,422,169 | 12/1983 | Vitale | 369/45 |
| 4,451,913 | 5/1984 | Elliott | 369/110 |
| 4,564,931 | 1/1986 | O'Hara | 369/110 |
| 4,568,142 | 2/1986 | Iguma | 350/6.3 |
| 4,615,585 | 10/1986 | Van Sluys | 350/255 |
| 4,633,456 | 12/1986 | Luecke | 369/45 |
| 4,646,283 | 2/1987 | Ito | 369/256 |
| 4,702,569 | 10/1987 | Mercado | 350/479 |
| 4,704,008 | 11/1987 | Mercado | 350/420 |
| 4,734,905 | 3/1988 | Kuwayama | 369/111 |
| 4,734,906 | 3/1988 | Baer | 363/112 |
| 4,742,218 | 5/1988 | Nakamura | 250/201 |
| 4,761,064 | 8/1988 | Mercado | 350/482 |
| 4,770,507 | 9/1988 | Arimoto | 350/421 |
| 4,774,699 | 9/1988 | Giddings | 369/32 |
| 4,789,977 | 12/1988 | Oudenhuysen | 369/109 |
| 4,798,447 | 1/1989 | Jansen | 350/255 |
| 4,799,210 | 1/1989 | Wilson | 369/110 |
| 4,809,247 | 2/1989 | Elliott | 369/44 |
| 4,891,799 | 1/1990 | Nakano | 369/45 |
| 4,939,711 | 7/1990 | Yoda | 369/13 |
| 5,136,558 | 8/1992 | Getreuer et al. | 369/44.15 |

FOREIGN PATENT DOCUMENTS 61-85640  5/1986  Japan .................. 369/44.14

Primary Examiner—Scott J. Sugarman
Assistant Examiner—Muhammad N. Edun
Attorney, Agent, or Firm—Townsend and Townsend Khourie and Crew

[57] ABSTRACT

An apparatus for the dynamic positioning of an objective lens in an optical disk drive comprises a housing, a lens unit movable in a focusing and a tracking direction, a magnetic circuit mounted to the lens unit for creating a first magnetic field, a pair of current conducting coils mounted to the housing and arranged orthogonal to the first magnetic field, and a flexure for flexibly supporting the lens unit in the housing. An active region comprising at least half of the coil creates the second magnetic field in response to current passing therethrough to interact with the first magnetic field and apply a force to the lens unit. This efficient coil arrangement allows for a small, lightweight dual-purpose magnetic circuit which substantially reduces the weight of the lens positioning apparatus. The housing is a one-piece injection molded ceramic component which maximizes stiffness and minimizes weight to improve the performance of the apparatus.

20 Claims, 6 Drawing Sheets

ELECTROMAGNETIC LENS ACTUATOR FOR OPTICAL DISK DRIVE

This is a continuation of application Ser. No. 08/042,332, filed Apr. 2, 1993, now abandoned.

BACKGROUND OF THE INVENTION

The present invention relates generally to optical disk drives for reading and recording data on optical disk media, and more particularly to an electromagnetic apparatus for the dynamic positioning of an objective lens element in an optical disk drive.

In an optical disk drive apparatus using laser light, a laser beam is focused on a recordable surface of an optical disk by an objective lens which traverses the span of the disk in a radial direction simultaneously with relatively high speed rotation of the disk. In this manner, a spiral pattern of closely spaced tracks is formed on the disk to represent recorded information. A comprehensive description of optical data recording techniques is found in Marchant, *Optical Recording* (Addison-Wesley 1990), the complete disclosure of which is incorporated herein by reference.

For maximum storage capacity on the disk, it is desirable to form the information tracks on the disk to have a narrow width and a narrow center-to-center spacing between radially adjacent tracks. Accordingly, for both reading and recording, it is imperative that the laser light beam is accurately and precisely positioned and focused upon a particular track on the disk.

Typically, the objective lens is moved radially from track to track by a coarse positioning actuator. After the lens is coarsely positioned, a fine-positioning actuator moves the objective lens very slightly in the radial (tracking) direction to precisely maintain position over a particular track. The fine-positioning actuator will further position the lens in the vertical (optical or focusing) direction to maintain the proper focus of the light beam on the information-carrying surface of the disk. The fine positioning actuator commonly drives the objective lens in the tracking and focusing directions by the interaction of two electro-magnetic drive coils and a common magnetic field produced by a magnetic circuit, one fixed to the lens holder element and one mounted on the coarse positioning actuator housing, or carriage. The force created by the cross product of the active portions of the coils and magnetic field must be relatively large due to the weight of the moving elements, as well as the precision, and acceleration required in properly positioning the objective lens.

Usually, the objective lens and fine positioning actuator are mounted on a carriage movable in the radial direction by the coarse positioning actuator. An important factor in the performance of such coarse positioning actuators is, therefore, the size and mass of the fine-positioning actuator. Some known fine positioning actuators are undesirably large and heavy because they employ magnetic circuits having heavy steel yoke elements and magnets to create a concentrated magnetic field of sufficient magnitude to move the objective lens accurately. For an example of such a fine positioning lens actuator, see U.S. Pat. Nos. 4,568,142 and 4,646,283, the complete disclosures of which are incorporated herein by reference. These patents disclose positioning apparatus for an objective lens with, as shown in FIGS. 1A and 1B, a large magnetic circuit having heavy yoke plates (labelled 2a, 2b in FIG. 1A; 4 in FIG. 1B) surrounding a pair of magnets (labeled 3a, 3b in FIG. 1A; 5a, 5b in FIG. 1B). In such a device, the coarse positioning actuator must move a large, heavy payload, resulting in slow seeking operations unless a coarse positioning actuator of substantial size and coarse positioning power is utilized, often limited by internal generation near the optics on the moving part including the objective lens and a turning mirror.

One reason that known devices have incorporated magnetic circuits of such size is that the electro-magnetic coil usage in such devices is generally inefficient. This is due largely to the fact that only a small portion of the coil is active in producing force useful for lens positioning. The nature of the inefficiency is due to having either a poor percentage of the coil present within the magnetic field, or to arranging coils within the magnetic field having a direction of current flow non-orthogonal to the field and desired force axes. In order to generate a positioning force of sufficient strength, the magnetic circuit must generate a relatively large magnetic field to compensate for the inefficiency of the coil. A large magnetic circuit is therefore used to generate a magnetic field which is relatively strong in comparison to the field produced by the coil.

Another important consideration in lens actuator performance is the weight and stiffness of the structural components. In order to achieve a high level of performance, weight should be minimized and stiffness maximized. Typically, the structural members of the fine positioning actuator are created out of aluminum, magnesium or engineering plastics. The problem with these materials is that they may have insufficient rigidity and/or undesirably high weight. The use of conventional materials can therefore result in lower acceleration capability and degraded frequency response affecting seek and track-following performance.

For these reasons, an objective lens fine positioning actuator is desired which has reduced size, height and weight, yet high efficiency in generating magnetic forces to position the lens in both the tracking and focusing directions. It is further desired that the components of the actuator have greater stiffness to improve the actuator frequency response.

SUMMARY OF THE INVENTION

The present invention provides an apparatus for the dynamic positioning of an objective lens element in an optical disk drive system that utilizes a highly efficient electromagnetic coil and a relatively small magnetic circuit to generate magnetic fields for driving the lens element. The invention further provides a lens actuator having structural components with very high stiffness and low weight.

According to one aspect of the invention, a fine-positioning lens actuator comprises a housing, a lens unit movable in a focusing and a tracking direction within the housing, a magnetic circuit mounted to the lens unit for creating a first magnetic field, at least one current conducting coil assembly mounted to the housing interactive with the first magnetic field, and means for flexibly supporting the lens unit in the housing. The coil assembly is configured such that more than half of the coil comprises an active region through which current flows and interacts with the first magnetic field to apply a force to the lens unit in either the focus or tracking directions.

The coil assembly preferably includes four pairs of coils, two pairs mounted on opposing sides of the housing. In an exemplary embodiment, the coils are oval shaped, with two generally parallel elongate portions connected at their ends by semicircular end portions. On each side of the housing, a first pair of coils is mounted so that the elongate portions are aligned with the tracking direction, while a second pair is mounted with the elongate portions aligned with the focus direction. This efficient configuration provides a large magnetic field that can interact with a small, light-weight magnetic circuit to accurately position the lens unit in the tracking and focusing directions.

In a specific aspect of the invention, a magnetic circuit is mounted on opposing sides of the lens unit, each circuit interacting with two of the pairs of coils. The magnetic circuits are usually cross-shaped with a rectangular N-pole piece and two smaller rectangular S-pole pieces mounted centrally on opposing long sides of the N pole piece.

In another aspect of the invention, the housing and other supporting structures for the lens unit are constructed as one-piece injection molded ceramic components. The stiffness of these components are 5–25 times greater than traditional materials while having relatively low density. Therefore, the size and weight of the actuator and the supporting structures can be reduced while maintaining the same, or improved, dynamic performance. The manufacturing process also achieves high precision, allowing thin-walled sections to be created, thereby further reducing the weight of the structural components.

A further understanding of the nature and advantages of the invention may be realized by reference to the remaining portions of the specification and the drawings.

DESCRIPTION OF SPECIFIC EMBODIMENTS

The objective lens drive apparatus of the present invention will be described in detail in conjunction with FIGS. 2–6.

Figure 1A:
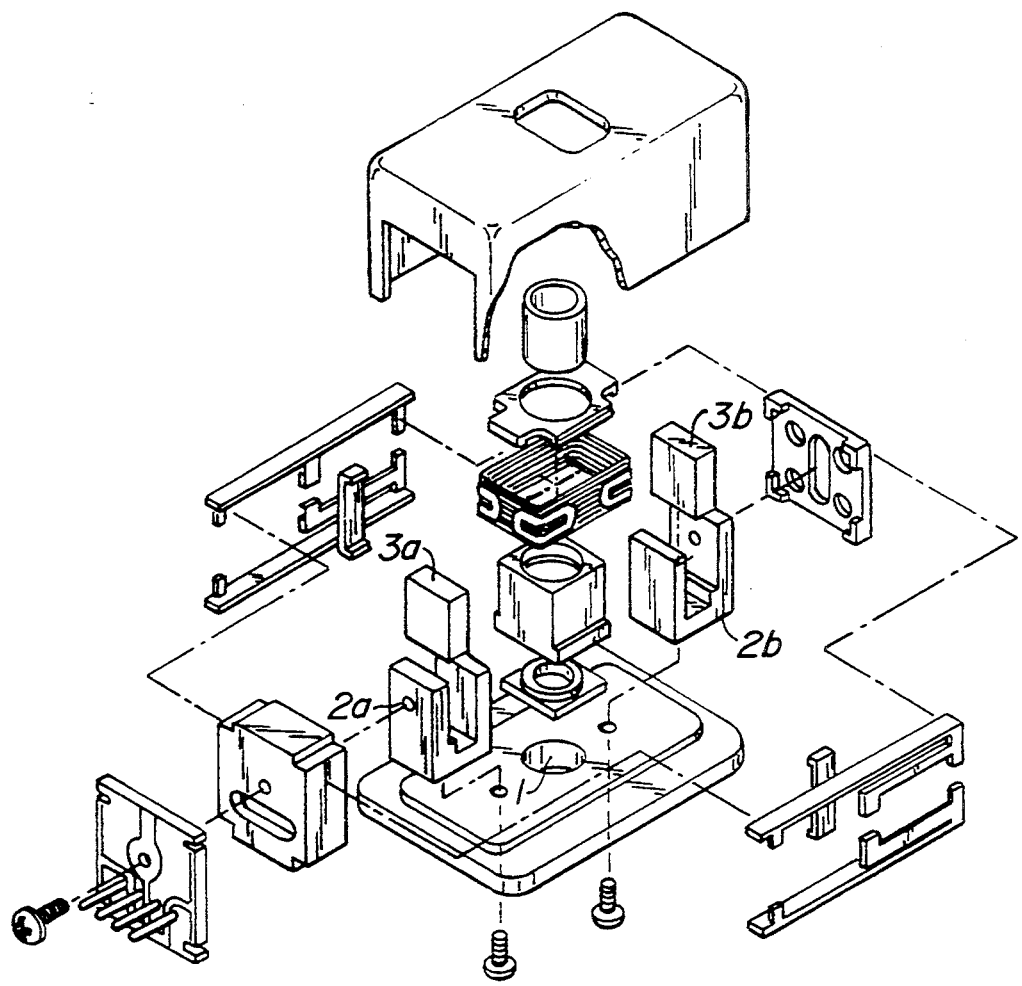
FIGS. 1A and 1B are exploded views of disk drive lens actuators according to the prior art.
Figure 1B:
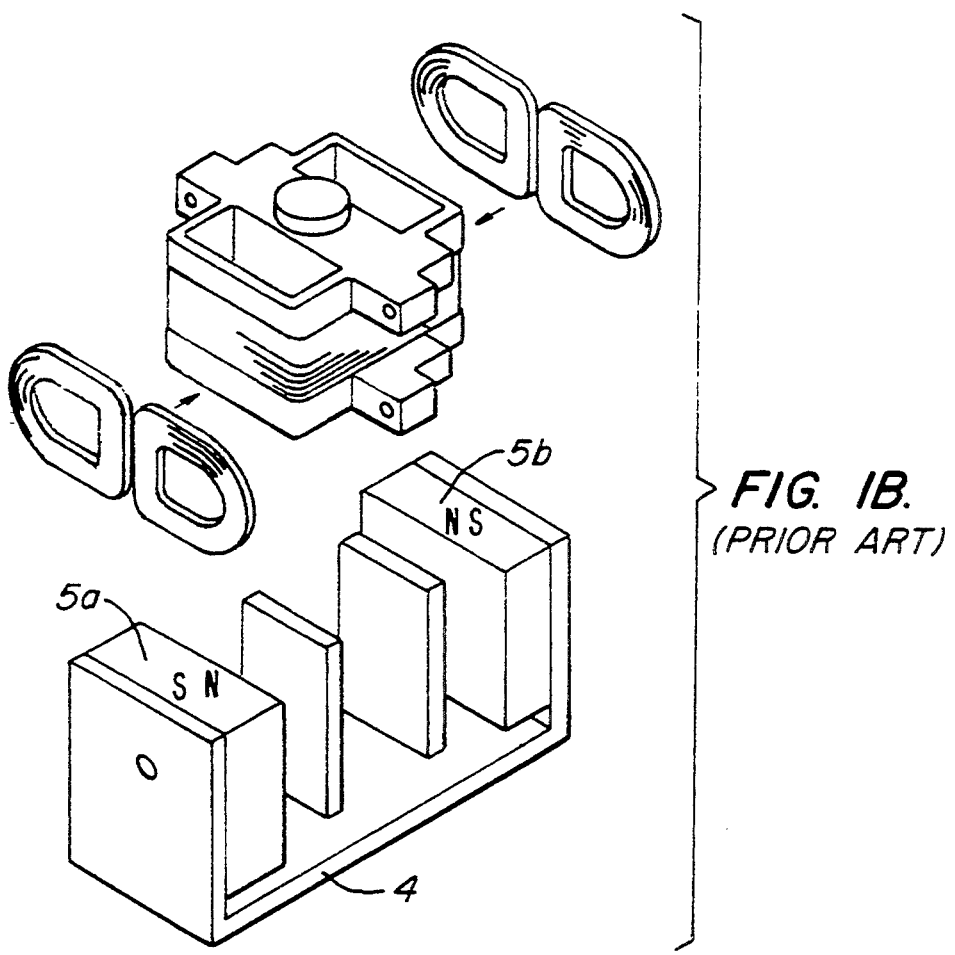
Figure 2:
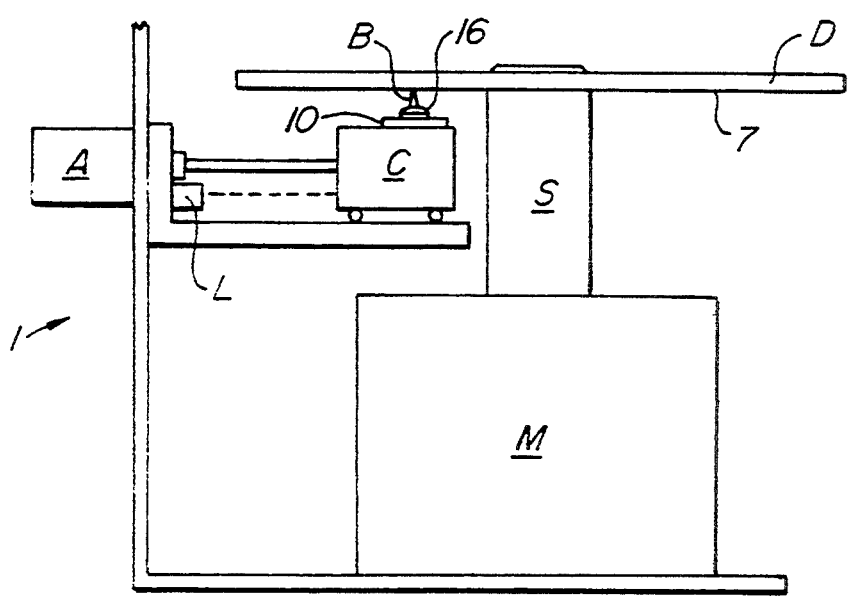
FIG. 2 is a schematic of an optical disk drive constructed in accordance with the principles of the present invention.

As illustrated in FIG. 2, optical disk drive 1 includes a motor M having spindle S onto which an optical disk D is mounted. A lower surface 7 of disk D is recordable with electronic information. Disk drive 1 further includes a coarse-positioning actuator A to which a carriage C is attached. Coarse positioning actuator A moves carriage C in a radial direction parallel to surface 7 of disk D. A fine positioning lens actuator 10 is mounted in carriage C. A lens 16 is positioned by fine positioning lens actuator 10 for focusing a laser light beam B onto recordable surface 7 of disk D. Laser light beam B is emitted from laser source L and directed toward disk surface 7 by a reflective mirror (not shown) within carriage C.

The disk drive 1 reads, records or erases information on disk D as follows: Motor M rotates spindle S and disk D at a relatively high speed. Coarse-positioning actuator A positions carriage C at a coarse position where laser light beam B may be directed on or near a particular track on surface 7 where information is to be read, recorded or erased. Fine positioning actuator 10 then precisely positions beam B on the track, by moving lens 16 relative to carriage C in the radial direction. Fine positioning actuator 10 further positions lens 16 a desired vertical distance from disk surface 7 so as to focus beam B. The read, record or erase operation is then performed by emitting laser beam B at the appropriate intensity onto the track on surface 7.

Figure 3:
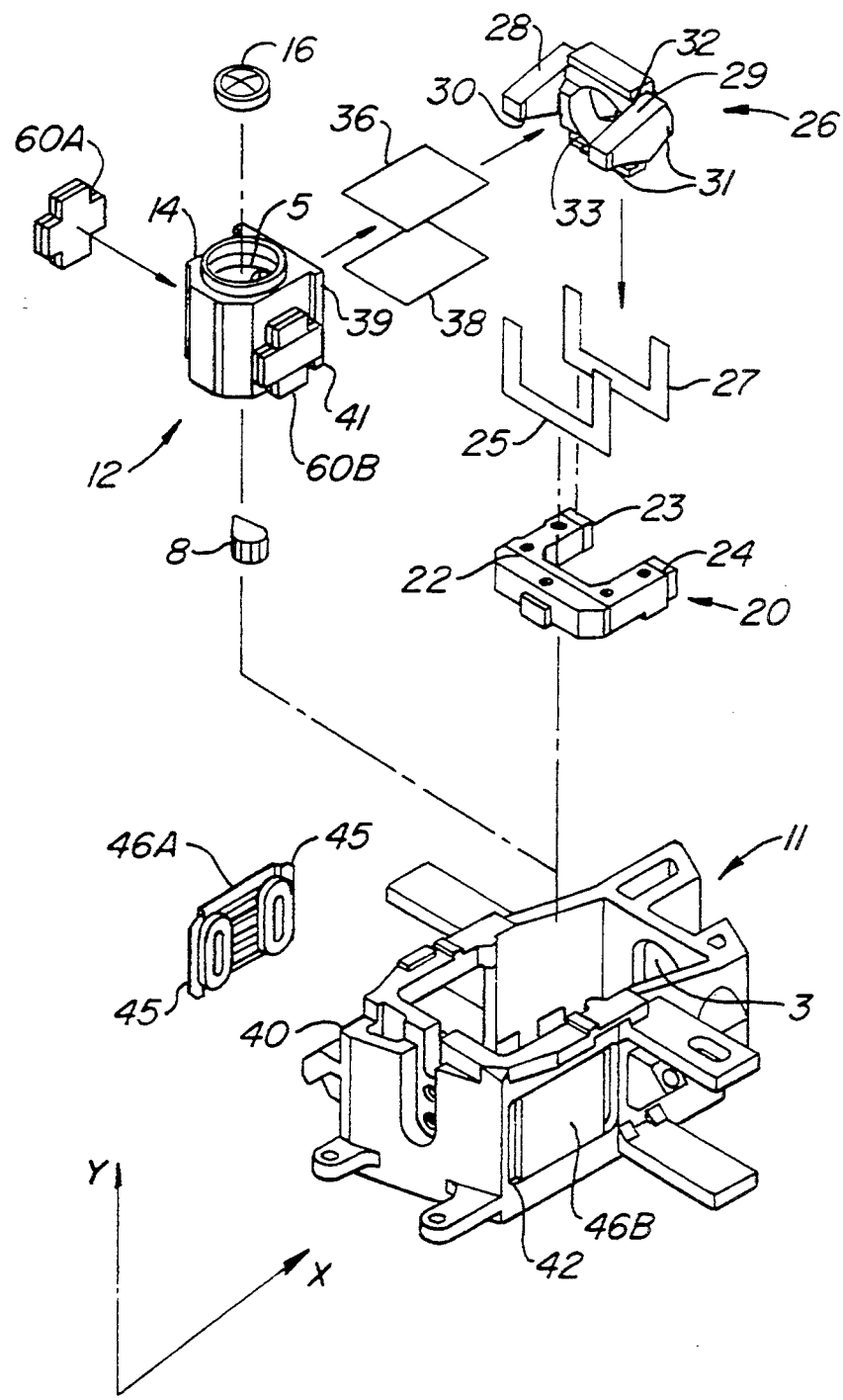
FIG. 3 is an exploded assembly view of an objective lens actuator constructed in accordance with the principles of the present invention.

FIG. 3 shows a fine positioning actuator 10 for positioning a lens unit 12 along the X (radial) and Y (vertical) axes in an optical disk drive apparatus. The objective lens actuator 10 is mounted within a housing 11, which may be directly coupled to coarse positioning actuator 4 or to a carriage 5 coupled to coarse positioning actuator 4. The housing 11 is provided with a window 13 through which a laser light beam is emitted. The laser light beam is reflected by mirror 8 mounted within the housing 11 and focused on the optical disk for desired operations, e.g. reading, recording, or erasing, through an objective lens 16. Housing 11, lens unit 12, mirror 8, the laser light source, the coarse positioning actuator, and other components of the disk drive apparatus may be of any known construction to which the lens actuator 10 of the present invention may be adapted. An example of a typical disk drive apparatus is shown in U.S. Pat. No. 4,809,247, the full disclosure of which is incorporated herein by reference.

The lens unit 12 has a body 14 with a cylindrical bore 15 therethrough for unobstructed passage of the laser light beam reflected from mirror 8. Objective lens 16 is positioned within the cylindrical bore 15 for focusing the beam on the disk surface, which will reside in a position vertically upward of lens 16.

U-shaped base 20 is mounted within housing 11 on the bottom surface thereof. The base 20 is provided with channels 22, 23, 24 in which the lower edges of wafer-thin tracking flexures 25, 27 are secured. The tracking flexures 25, 27 are U-shaped flexible members, preferably of stainless steel, extending vertically upwards from base 20 on either side of the lens unit 12. Rider 26 has a pair of arms 28, 29, each provided with two channels 30, 31 for receiving the top edges of tracking flexures 25, 27.

Circular opening 34 in rider 26 is horizontally aligned with window 15 of the lens unit 12 for passage of the laser light beam. The rider 26 further includes horizontal channels 32, 33 for receiving edges of rectangular focus flexures 36, 38. The opposing edges of focus flexures 36, 38 are received in channels 39, 41 in body 14 of lens unit 12, so as to provide resilient support in the vertical (focus) direction. Usually, flexures 36, 38 are adhesively fixed in channels 32, 33, 39, 41. Thus, rider 26, base 20 and the focus and tracking flexures 25, 27, 36, and 38 serve as a flexible suspension system for the lens unit 12 within housing 11. Lens unit 12 is cantilevered at the ends of focus flexures 36, 38 extending from rider 26, which is supported in housing 11 by tracking flexures 25, 27.

Figure 4A:
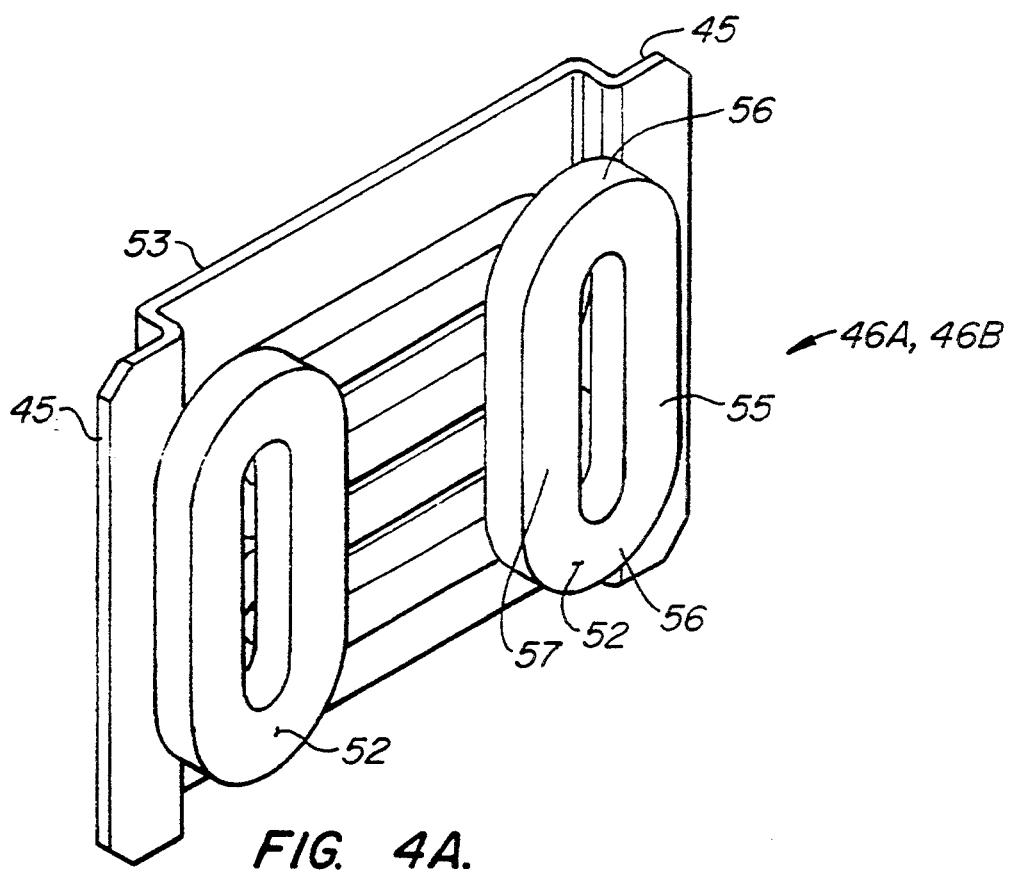
FIGS. 4A and 4B are perspective views of the coil assembly of the objective lens actuator of FIG. 3.
Figure 5A:
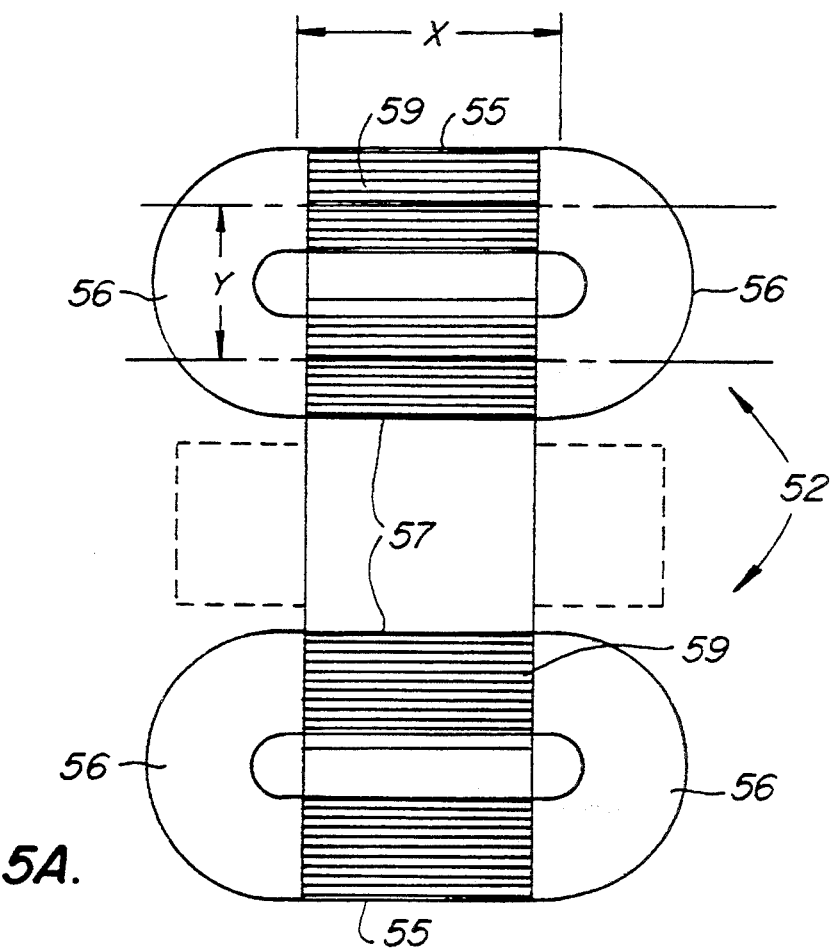
FIGS. 5A and 5B are front views of the coil assembly of FIG. 3, showing the active regions thereof.
Figure 5B:
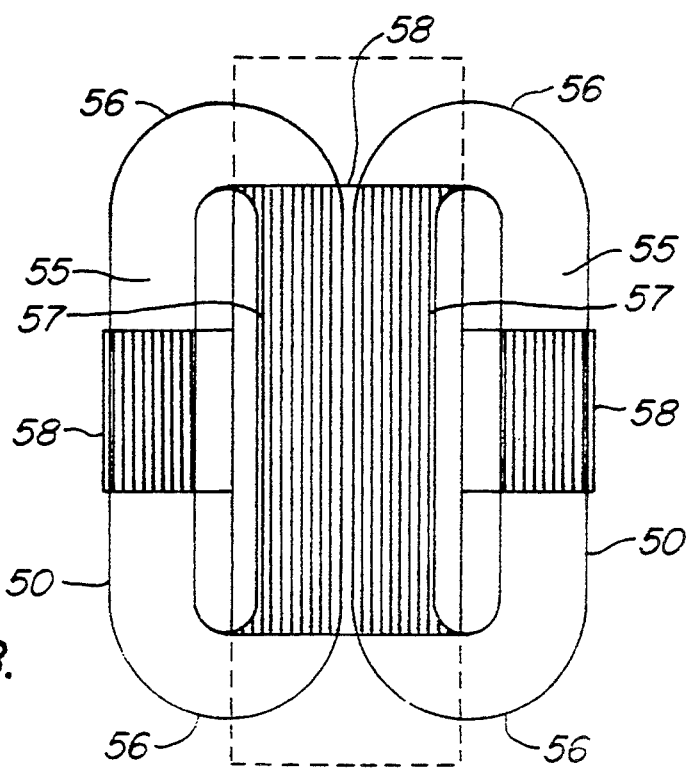

Coil assemblies 46a, 46b are mounted in openings 40, 42 on opposing sides of housing 11 with side flanges 45 received in vertical slots at the edges of openings 40, 42. As illustrated in FIG. 4A, the coil assemblies 46a, 46b each include horizontal focus coils 50 and vertical tracking coils 52 mounted to a mounting plate 53. Mounting plates 53, in a preferred embodiment, will comprise a magnetically conductive material, such as steel or other metal. As shown in FIGS. 5A–5B, the focus and tracking coils 50, 52 are oval-shaped, with two generally parallel long segments 55, 57 connected at their ends by semicircular or U-shaped segments 56. The length X of segments 55, 57 will usually be greater than, and preferably more than 1.5 times, the distance Y between the centerlines of segments 55, 57 (or the diameter of semicircular segments 56.)

Figure 4B:
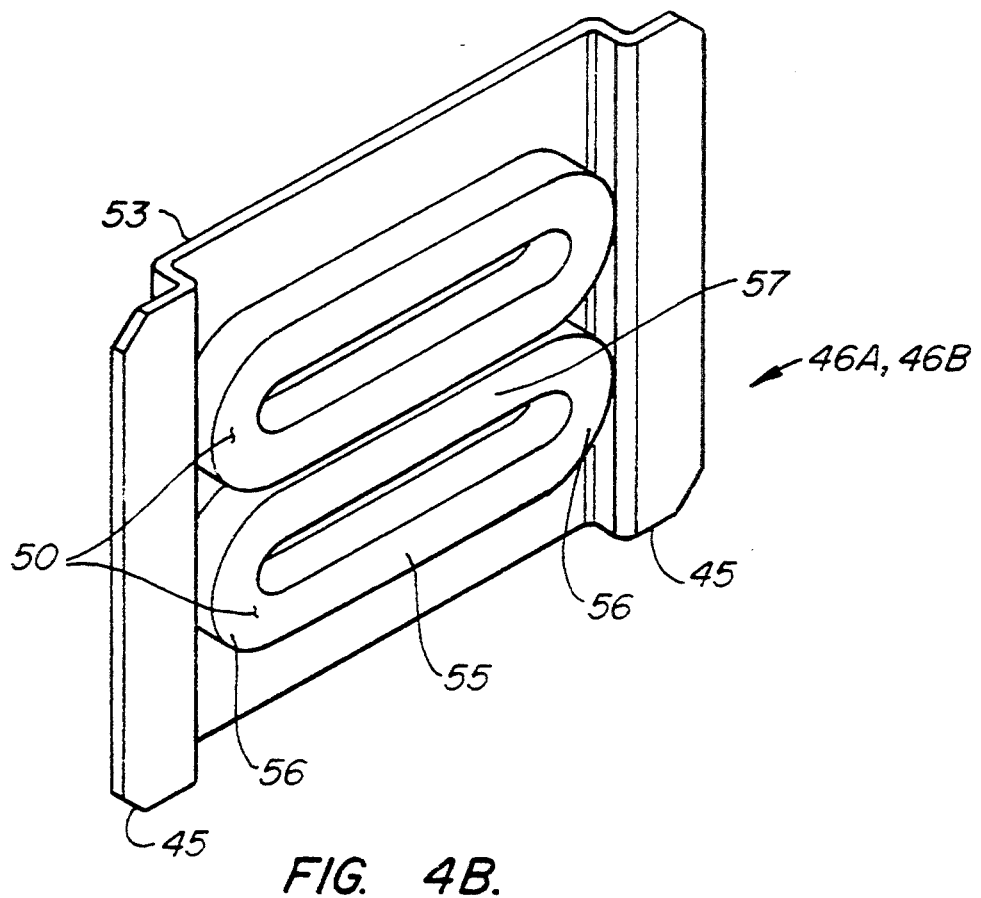

As shown in FIG. 4B, the focus coils 50 are mounted to a central recessed portion of mounting plate 53. As shown in FIG. 4A, the tracking coils 52 are positioned on top of and perpendicular to focus coils 50, with tracking coils 52 spaced apart a distance which is greater than the spacing between focus coils 50.

Focus coils 50 and tracking coils 52 are separately coupled to an electrical power supply. As illustrated in FIGS. 5A and 5B, a magnetic field will be generated throughout active regions 58, 59 of the focus and tracking coils 50, 52. As illustrated in FIG. 5B, the active regions 58 of the focus coils 50 include the interior long segments 57 and a portion of exterior long segments 55. In the tracking coils 52, as shown in FIG. 5A, the active regions 59 include major portions of long segments 55, 57. This arrangement allows over 50% of both the focus and tracking coils 50, 52 to be active in producing a useful current—that is, current over an exposed length perpendicular to the common permanent magnetic field generated by the magnetic circuits described below.

The configuration of the coil assemblies 46A, 46B of the present invention provides active regions 51, 53 of increased size and strength such that the massive steel yoke and magnet pieces of prior art devices are not required. Due to the improved efficiency of the coil assemblies, a smaller magnetic circuit may be used to obtain a given level of performance in the lens actuator. Therefore, the total payload which must be moved by the coarse positioning actuator of the disk drive is significantly less than in prior art devices. In an exemplary embodiment, the total weight of the lens actuator 10 is approximately 3.3 grams, as compared to conventional lens actuators weighing 6 grams or more. (See U.S. Pat. No. 4,571,026).

The present invention is not limited to the above coil arrangement, however. For example, the location of the tracking and focus coils 50, 52 could be reversed such that the tracking coils 52 are exterior to the focus coils 50 in relation to housing 11. Other arrangements could also be used as long as a sufficient portion of the coils comprise active regions such that the magnetic field generated by the coils can interact with a small, lightweight magnetic circuit to generate a sufficient force to accurately move the lens unit 12.

Figure 6A:
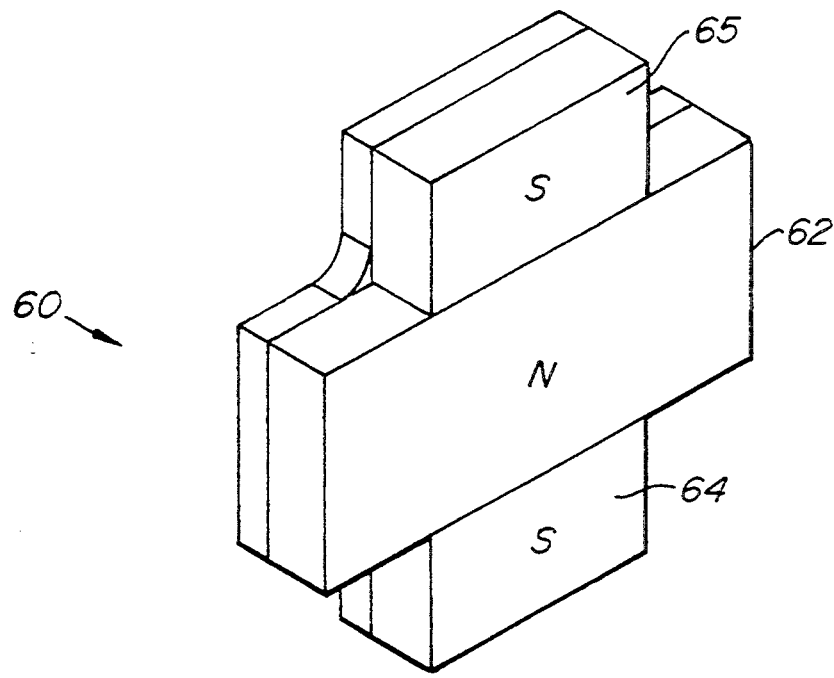
FIGS. 6A and 6B are perspective views of two embodiments of the magnetic circuit of the objective lens actuator of FIG. 3.
Figure 6B:
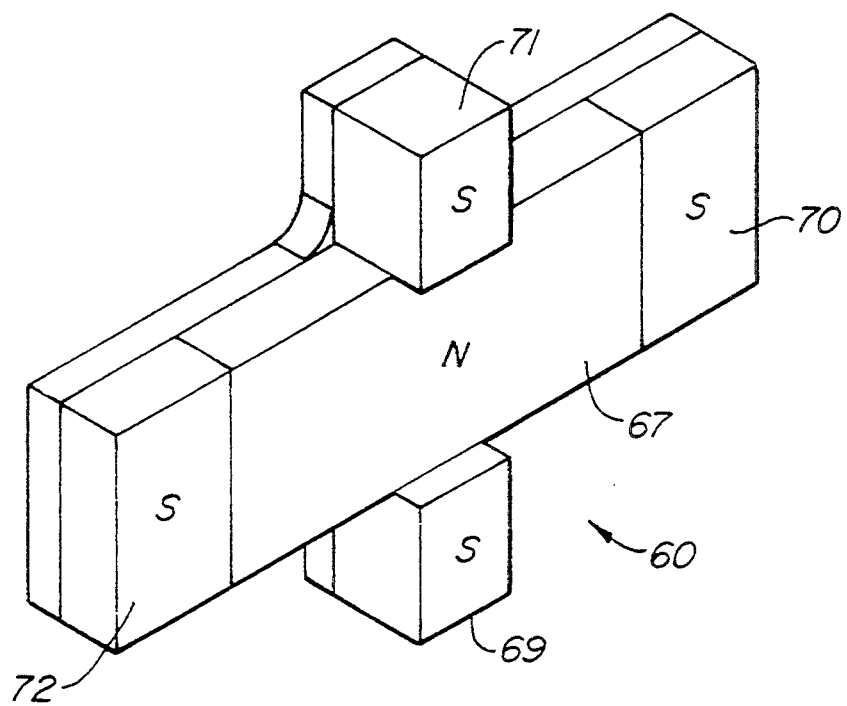

Magnetic circuits 60a, 60b of the present invention are illustrated in FIGS. 3, 6A and 6B. The magnetic circuits 60a, 60b are mounted on opposing sides of the lens unit 12 such that the magnetic circuits 60a, 60b move with lens unit 12. In a preferred embodiment, magnetic circuits 60a, 60b weigh less than 0.7 grams each. As illustrated in FIG. 6A, circuits 60a, 60b comprise two S poles 64, 65 and N pole 62, the S poles 64, 65 having an opposite polarity with respect to the N pole 62. The magnetic circuits 60a, 60b are shaped in a cross with N pole 62 forming the horizontal segment and S poles 64, 65 disposed above and below the middle portion of N pole 62 to form the vertical segment.

The magnetic circuits 60a, 60b, however, need not be arranged exactly as described above. An alternative embodiment is illustrated in FIG. 6B. In this embodiment, the magnetic circuit 60 is shaped as a cross with a long horizontal segment and a short vertical segment. A rectangular central portion of the vertical segment comprises an N pole 67. Four S poles 69, 70, 71 and 72 are disposed on all four sides of the N pole 67. S poles 70, 72 form part of the horizontal segment, while S poles 69, 71 form the vertical segment of the magnetic circuit.

The operation of the lens actuator in a preferred embodiment will now be described. A light beam is focused through objective lens 16 and radiated onto an optical disk. The focusing position of lens 16 is controlled by the interaction of the current in focus coils 50 with magnetic circuit 60. More specifically, a focusing state of lens 16 is detected by a detector (not shown) and converted into a focusing electrical signal. This focusing electrical signal is processed by a signal processing circuit, and a current of a selected magnitude is conducted to focus coils 50 from a power supply. The current within active regions 58 of focus coils 50 then interacts with the permanent magnetic field (approximately 2500 Gauss) generated by N pole 67 and S poles 69, 71 of the magnetic circuits 60a, 60b to produce a vertical force along the Y-axis that drives the objective lens 16 in the focusing direction by deflection of focus flexures 36, 38.

The tracking position of the light beam is controlled in a similar manner by use of the tracking coils 52. The current within active regions 59 of the tracking coils 52 interacts with the permanent magnetic field generated by N pole 67 and S poles 70, 72 of the magnetic circuits 60a, 60b to produce a horizontal force along the X-axis that drives the lens unit 12 (and the objective lens 16) in the tracking direction by deflection of tracking flexures 25, 27.

Although the preferred embodiment discloses a moving magnet drive, the present invention is not limited to this arrangement. For example, the moving and fixed parts could be reversed to embody a moving coil arrangement. Thus, the coil assemblies 46A, 46B may be mounted on the lens unit 12 such that they move with the lens unit 12 and the magnetic circuits 60a, 60b would be mounted in housing 11.

In another aspect of the present invention, the structural components of the apparatus are constructed of injection molded ceramics. Such components may include housing 11, base 20 and rider 26. In a preferred embodiment, the material used is $Al_2O_3$. However, a variety of structural ceramic materials may be used in accordance with the present invention. The use of ceramic structural components allows the size and weight of housing 11, base 20 and rider 26 to be greatly reduced while maintaining equal or improved dynamic performance. This is due to the lower weight and high stiffness of ceramic materials, which may be 5–25 times stiffer than conventional materials used for disk drive structural components.

An additional advantage of the use of injection molded ceramics is gained by the ability to produce thin-walled sections using injection molding techniques, further reducing the weight of the components. By the use of ceramics, such thin-walled components may be employed in the actuator without sacrificing structural rigidity.

Various known injection molding processes may be used to manufacture the ceramic structural components of the present invention. An example of a typical manufacturing process is shown in U.S. Pat. No. 4,798,447, the full disclosure of which is incorporated herein by reference.

Other modifications and variations may be made to the disclosed embodiments without departing from the scope of the invention as defined in the following claims.

What is claimed is:

1. An apparatus for positioning an objective lens in an optical disk drive comprising:
   a housing;
   a lens unit disposed within the housing;
   means for flexibly supporting the lens unit in the housing such that the lens unit is movable in at least a first direction relative to the housing;
   at least a first magnetic circuit mounted to the lens unit for creating a first magnetic field, each of the first magnetic circuits comprising a plurality of magnets; and
   at least a first current conducting coil mounted on a magnetically conductive surface coupled to the housing, the first current conducting coil being coupled to an electricity source and having a first active region orthogonal to the first magnetic field and interactive therewith to apply a force to the lens unit in the first direction, wherein the first active region comprises at least half of the coil, and wherein the magnetically conductive surface increases the efficiency with which the first active region interacts with the first magnetic field.

2. An apparatus according to claim 1 wherein the objective lens directs a light beam toward a surface of an optical disc in the disk drive, the first direction being perpendicular to said surface.

3. An apparatus according to claim 2 wherein the lens unit is further movable in a second direction parallel to said surface of the optical disc, the apparatus further comprising a second current conducting coil coupled to the magnetically conductive surface and coupled to an electricity source, the second coil having a second active region orthogonal to the first magnetic field and the first active region and interactive with the first magnetic field to apply a force to the lens unit in the second direction, wherein the second active region comprises at least half of the second coil.

4. An apparatus according to claim 3 wherein the first and second coils each comprise an oval-shaped coil having a pair of generally parallel elongate portions connected at their ends by a pair of U-shaped portions, the length of the elongate portions being greater than the distance between centerlines of the elongate portions, wherein the elongate portions of the first coil are oriented perpendicular to the first direction and the elongate portions of the second coil are oriented perpendicular to the second direction.

5. An apparatus according to claim 1 wherein the magnetic circuit comprises a rectangular first magnetic pole portion, longer sides of the first magnetic pole portion being parallel to the first direction, and a second magnetic pole portion coupled to the first magnetic pole portion perpendicular thereto, said second magnetic pole portion having an opposite polarity with respect to the first magnetic pole portion.

6. An apparatus according to claim 1 wherein the means for flexibly supporting the lens unit comprises a flexure coupled to the lens unit and to the housing, the flexure being flexible in said first direction and substantially rigid in a direction perpendicular to said first direction.

7. An apparatus for positioning an objective lens in an optical disk drive, the disk drive having a rotatable spindle for supporting an optical disk, and a light source for emitting a light beam through the lens toward an information-carrying surface of the optical disk, the apparatus comprising:
   a coarse positioning actuator;
   a housing coupled to the coarse positioning actuator and movable in a tracking direction parallel to the information-carrying surface of the optical disk;
   a lens unit disposed within the housing, the lens being mounted in the lens unit;
   means for flexibly supporting the lens unit in the housing such that the lens unit is movable in at least a first direction relative to the housing;
   at least a first magnetic circuit mounted to the lens unit for creating a first magnetic field, each of the first magnetic circuits comprising a plurality of magnets; and
   at least a first current conducting coil mounted on a magnetically conductive surface coupled to the housing, the first current conducting coil being coupled to an electricity source and having two generally parallel elongate segments orthogonal to the first direction and the first magnetic field and connected at their ends by a pair of U-shaped segments, the length of the elongate segments being greater than the distance between centerlines of the elongate segments, wherein current flow through the coil interacts with the first magnetic field to position the lens unit in the first direction, and wherein the magnetically conductive surface increases the efficiency with which the current flow interacts with the first magnetic field.

8. The apparatus of claim 7 wherein the first direction is a focus direction perpendicular to the information-carrying surface of the disk.

9. The apparatus of claim 8 wherein the lens unit is further movable in the tracking direction relative to the housing, the apparatus further comprising a second current conducting coil having two generally parallel elongate segments orthogonal to the tracking direction and the elongate segments of the first coil and connected at their ends by a pair of U-shaped segments, the length of the elongate segments of the second coil being greater than the distance between centerlines of said elongate segments, wherein the second current conducting coil is coupled to the magnetically conducting surface, and wherein current through the second coil interacts with the first magnetic field to position the lens unit in the tracking direction relative to the housing.

10. The apparatus according to claim 9 wherein the means for flexibly supporting the lens unit comprises a first flexure generally parallel to the tracking direction and a second flexure generally parallel to the focus direction, the first flexure being coupled at a first end to the lens unit and at a second end to an upper end of the second flexure, a lower end of the second flexure being coupled to the housing, wherein the first flexure is deflectable in the focus direction and the second flexure is deflectable in the tracking direction.

11. The apparatus of claim 7 wherein the first magnetic field is produced by an active region of the coil, the active region comprising at least 50% of the coil.

12. The apparatus of claim 7 wherein the magnetic circuit comprises a horizontal portion having a first polarity and a vertical portion having a second polarity, the horizontal portion being parallel to the tracking direction and the vertical portion being parallel to the focus direction.

13. The apparatus according to claim 7 wherein the means for flexibly supporting the lens unit comprises a flexure coupled to the lens unit and to the housing, the flexure being flexible in said first direction and substantially rigid in a direction perpendicular to the first direction.

14. The apparatus according to claim 7 wherein the housing is injection-molded ceramic.

15. The apparatus according to claim 7 wherein the magnetic circuit has a weight of less than 1 gram.

16. The apparatus according to claim 7 wherein the lens unit, magnetic circuit, coil, and supporting means have a combined weight of less than 3.5 grams.

17. An apparatus for positioning an objective lens in an optical disk drive, the disk drive having a rotatable spindle for supporting an optical disk, and a light source for emitting a light beam through the lens toward an information-carrying surface of the optical disk, the apparatus comprising:
   a coarse positioning actuator;
   a one-piece injection-molded ceramic housing coupled to the coarse positioning actuator and movable in a tracking direction parallel to the information-carrying surface of the optical disk;
   a lens unit disposed within the housing, the lens being mounted in the lens unit;
   means for flexibly supporting the lens unit in the housing such that the lens unit is movable in at least a first direction relative to the housing;
   at least a first magnetic circuit mounted to the lens unit for creating a first magnetic field, each of the first magnetic circuits comprising a plurality of magnets; and
   at least a first current conducting coil mounted on a magnetically conductive surface coupled to the housing, the first current conducting coil being coupled to an electricity source, wherein current flow through the coil orthogonal to the first magnetic field interacts with the first magnetic field to apply a force to the lens unit for positioning the lens unit in the first direction, and wherein the magnetically conductive surface increases the efficiency with which the current flow interacts with the first magnetic field.

18. The apparatus according to claim 17 wherein the coil has two generally parallel elongate segments oriented perpendicular to the first direction and connected at their ends by a pair of U-shaped segments, the length of the elongate segments being greater than the distance between centerlines of the elongate segments.

19. The apparatus according to claim 18 wherein the first magnetic field is produced by an active region of the coil, the active region comprising at least 50% of the coil.

20. The apparatus according to claim 17 wherein the lens unit is further movable in a second direction perpendicular to the first direction, the apparatus further comprising a second current-conducting coil coupled to the magnetically conductive surface and orthogonal to the first magnetic field and the first coil and interactive with the first magnetic field to position the lens in the second direction.

* * * * *